United States Patent [19]

Chen et al.

[11] Patent Number: 5,313,840

[45] Date of Patent: May 24, 1994

[54] TACTILE SHEAR SENSOR USING ANISOTROPICALLY CONDUCTIVE MATERIAL

[75] Inventors: Li-Han Chen, Summit; Sungho Jin, Millington, both of N.J.

[73] Assignee: AT&T Bell Laboratories, Murray Hill, N.J.

[21] Appl. No.: 969,626

[22] Filed: Oct. 30, 1992

[51] Int. Cl.$^5$ .............................................. G01L 1/00
[52] U.S. Cl. .......................................... 73/763; 73/767
[58] Field of Search ................. 73/763, 865.7, 172, 73/767, 862.046; 901/33; 414/5; 273/148 B

[56] References Cited

U.S. PATENT DOCUMENTS

| | | | |
|---|---|---|---|
| 4,014,217 | 3/1977 | Lagasse et al. | 73/865.7 |
| 4,492,949 | 1/1985 | Peterson et al. | 73/862.046 |
| 4,588,348 | 5/1986 | Beni et al. | 901/33 |
| 4,668,861 | 5/1987 | White | 250/227 |

OTHER PUBLICATIONS

T. J. Nelson, Et al. "Shear-Sensitive Magnetoresistive Robotic Tactile Sensor", *IEEE Transactions on Magnetics*, vol. MAG-22, No. 5 (1986).
S. Jin, et al. "Optically Transparent, Electrically Conductive Composite Medium" *Science*, vol. 255, pp. 446–448 (1992).
S. Jin, et al. "New, Z–direction anisotropically conductive composites", *Journal of Applied Physics*, vol. 64, No. 10, Part II (1988).
L. D. Harmon "Automated Tactile Sensing" *The International Journal of Robotic Research*, vol. 1, No. 2, pp. 3–32 (1982).

Primary Examiner—Hezron E. Williams
Assistant Examiner—Mort Smith
Attorney, Agent, or Firm—Glen E. Books

[57] ABSTRACT

In accordance with the present invention, a tactile sensor capable of detecting shear force comprises an anisotropically conductive material disposed between a conductive cursor and an array of contacts. In one preferred embodiment, the anisotropic material is affixed to the contact array, and the cursor is affixed to an elastomeric skin overlying the material. Movement of the cursor is detected by interconnection of the contacts underlying the cursor. In a second embodiment, the anisotropic material is affixed to the cursor but is free to move over the contact array in response to shear force. Movement of the cursor is detected by interconnection of the underlying contacts. Such arrangements can also detect pressure and temperature.

10 Claims, 3 Drawing Sheets

TACTILE SHEAR SENSOR USING ANISOTROPICALLY CONDUCTIVE MATERIAL

FIELD OF THE INVENTION

This invention relates to sensors, such as tactile shear sensors, using anisotropically conductive material. Such sensors can be used in a wide variety of applications including touch-sensitive controllers for computer-related products and touch sensitive robotic skins.

BACKGROUND OF THE INVENTION

Tactile sensors are useful in a wide variety of applications for robotics and computer hardware. In robotics tactile sensors provide several types of useful information about the state of contact between a robot hand and an object in prehension. Sensors can indicate the presence of an object, its location in the hand, the force of contact and, in addition, can provide information concerning the shape of the object. Unfortunately, most robotic sensors can measure only compressive force without regard for shear movement. Shear sensors would be useful, for example, in detecting the movement of a grasped object.

Most controls for computer-related products are pressure sensitive devices such as keys. Controllers such as the computer "mouse" or the computer "joy-stick" are responsive to movement in two dimensions but are relatively bulky, complex to manufacture and subject to mechanical failure. Accordingly, there exists a need for simple, compact tactile shear sensors for robotic and computer applications.

SUMMARY OF THE INVENTION

In accordance with the present invention, a tactile sensor capable of detecting shear force comprises an anisotropically conductive material disposed between a conductive cursor and an array of contacts. In one preferred embodiment, the anisotropic material is affixed to the contact array, and the cursor is affixed to an elastomeric skin overlying the material. Movement of the cursor is detected by interconnection of the contacts underlying the cursor. In a second embodiment, the anisotropic material is affixed to the cursor but is free to move over the contact array in response to shear force. Movement of the cursor is detected by interconnection of the underlying contacts. Such arrangements can also detect pressure and temperature.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
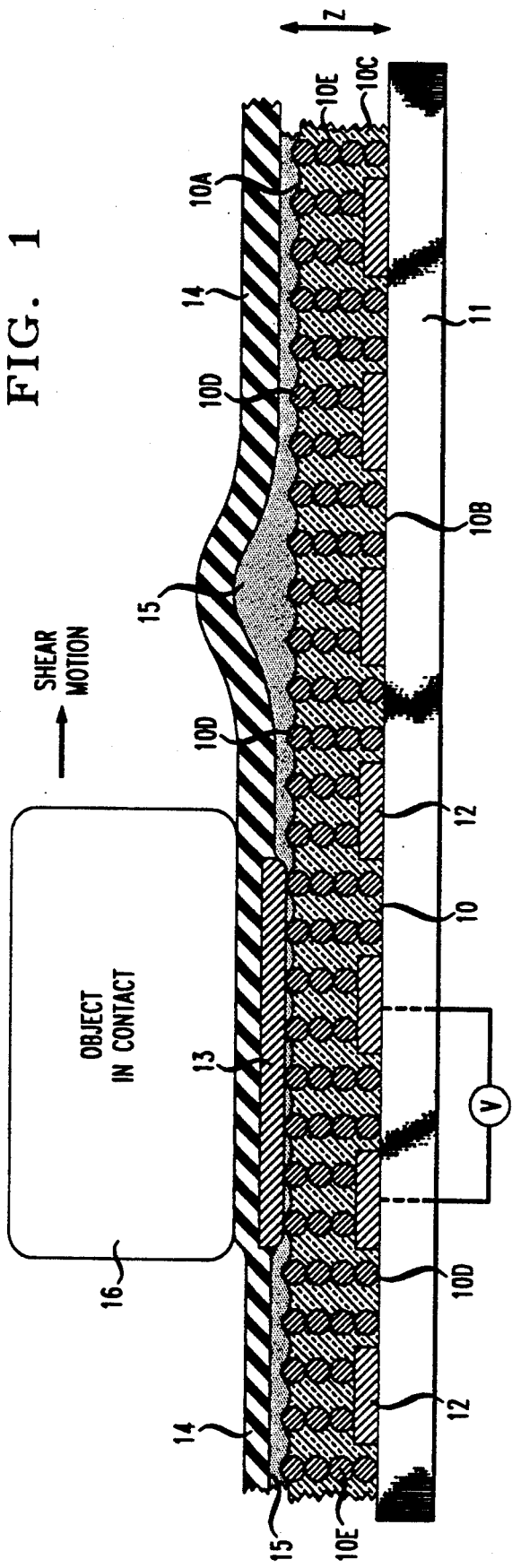
FIG. 1 is a schematic cross section of a first embodiment of a sensor in accordance with the invention.

Referring to the drawings, FIG. 1 is a schematic cross section of a tactile sensor capable of detecting shear force comprising a layer 10 of material anisotropically conductive across its thickness direction Z. The anisotropic layer 10 is attached to a non-conductive surface 11 such as the surface of a circuit board, containing an array of conductive electrical contacts 12. Overlying layer 10 is a conductive cursor 13 positioned and dimensioned to provide through layer 10 an electrical path between at least two contacts 12. Preferably the cursor is attached to an elastomeric outer layer 14. Advantageously, a lubricant 15 such as lubricating oil is sealed between layer 10 and outer layer 14.

In operation shear force applied by an object 16 to layer 14 near the cursor 13 stretches layer 14 and laterally displaces the cursor in relation to contacts 12. Accordingly, the displaced cursor 13 will make contact through layer 10 with a different subset of the array contacts than it would make in the equilibrium position, and the displaced location of the cursor can be directly measured from the interconnection between underlying contacts. As illustrated cursor location can be detected, for example, by the simple criterion of contact/no-contact between adjacent pads 12, as electrical connection across a voltage source V is made possible only under the sliding cursor.

The cursor should be large enough to cover at least a pair of neighboring contact pads. During shear motion, the cursor location, extent and speed can be continually detected by monitoring the occurrence of newly connected or disconnected pairs.

Figure 2:
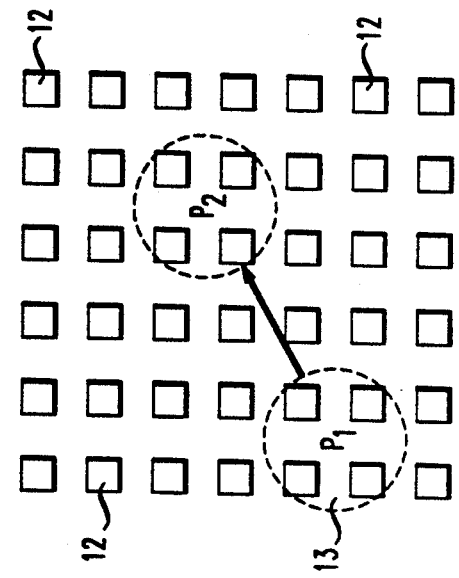
FIGS. 2, 3 and 4 are schematic top views of contact arrays for the sensor of FIG. 1.

FIG. 2 is a schematic top view of an illustrative array of contacts for the sensor of FIG. 1 comprising a rectangular grid of contacts 12. As can be seen, movement of cursor 13 from an initial position $P_1$ to position $P_2$ interconnects a different subset of underlying contacts 12.

Figure 3:
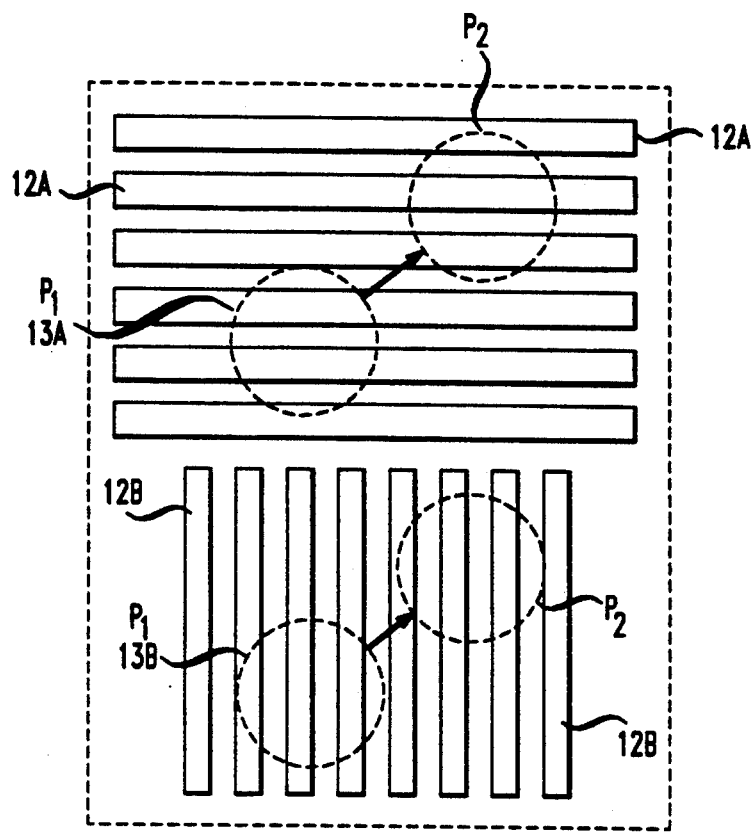

FIG. 3 is a schematic top view of an alternative embodiment comprising a first linear array of elongated contacts 12a and a second linear array of elongated contacts 12b perpendicular to the first array. A pair of cursors 13A and 13B permit separate detection of shear force in each of the two orthogonal directions.

Figure 4:
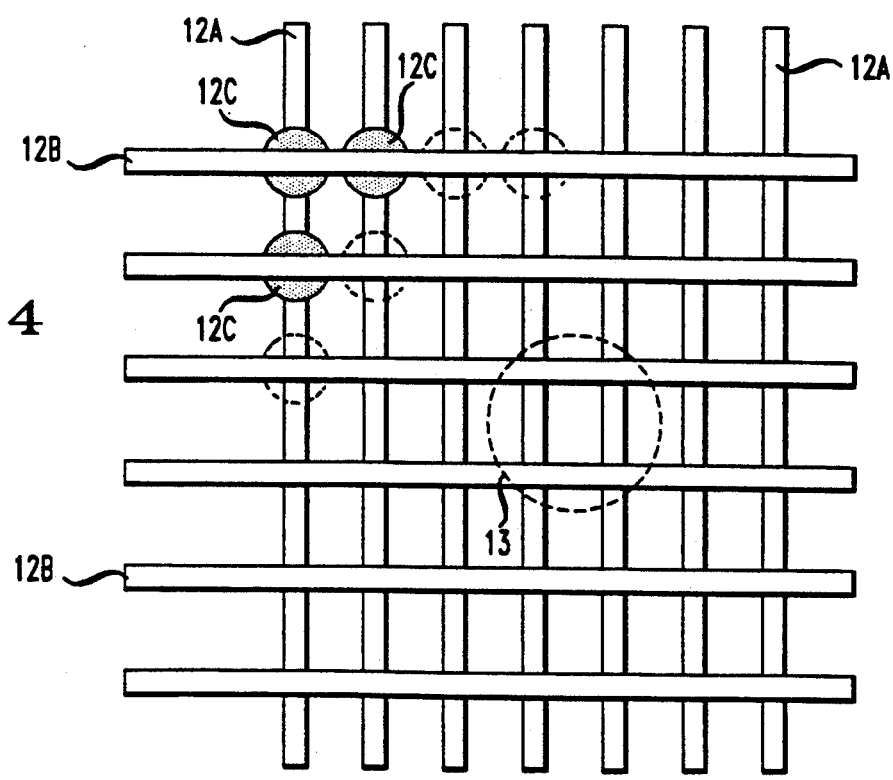

FIG. 4 is a schematic top view of another alternative embodiment similar to that of FIG. 3 except the two perpendicular linear arrays 12A and 12B are superimposed and insulated from each other by insulators 12C.

The anisotropic conductive layer 10 is preferably a composite material having a pair of major surfaces 10A and 10B comprising a non-magnetic matrix material 10C and a plurality of columns 10D of magnetic particles 10E extending in the Z-direction between the major surfaces. The anisotropic material is prepared by curing a mixture of magnetic metal particles 10E and the matrix material 10C in the presence of a magnetic field perpendicular to the major surfaces. The result is many vertically aligned but laterally isolated columns 10D of conductive particles, the ends of which protrude slightly from the top surface.

The matrix material 10C can be a polymeric material such as an elastomer or adhesive or it can be glass. It can be compliant or rigid in its final form, but the material should go through a viscous state before curing or setting. Useful materials include epoxies, glasses, silicone elastomers, and polyurethane resins. While transparent media are preferred for a number of applications, the material can also be lightly colored for decoration. Typical thicknesses are 2-5000 micrometers and 10-500 micrometers is preferred.

The particles 10E are magnetic particles of conductive material. They can be magnetic metals such as Fe, Ni or Co, magnetic alloys such as $Ni_{80}Fe_{20}$, $SmCo_5$ or $Nd_2Fe_{14}B$ or magnetic oxides such as ferrites (hard or soft). Advantageously, the particles are coated with gold or silver for corrosion resistance and to reduce light absorption. Typical particle diameters are in the range 0.1 to 2000 micrometers with a preferred range of 10-500 micrometers.

The FIG. 1 sensor can be fabricated by first providing a substrate surface 11 with an array of contacts 12. This can be a printed circuit board provided with an array of metal contacts in accordance with techniques well known in the art. The next step is to mix particles 10E (in a demagnetized state) with matrix material 10 in a viscous state. Preferably, the volume fraction of particles is 0.5-5%. After mixing the material is applied onto substrate surface 11, and while in the initial viscous state, is subjected to a magnetic field (preferably 200-1000 Oe) during hardening or cure into layer 10. The effect of the magnetic field is to cause the particles to become magnetized and to move in the viscous material into a configuration of columns 10D extending substantially through the layer 10 distributed with substantially uniform area density.

After layer 10 reaches its cured or hardened state, lubricant 15 can be applied to the exposed surface. Cursor 13 is attached to outer layer 14, as by embedding and/or bonding, and boundaries of layer 14 surrounding the cursor are fixed in relation to layer 10 as by clamping or bonding.

The resolution of shear motion sensing depends on the size and spacing of the contact pads as well as the size and spacing of the conducting columns. Since it is desirable to have several conducting columns touching each pad area, the lower limit in pad size is determined from the column density in layer 10. The intercolumnar spacing Y is approximately $Y=(D^2/1.65 X)^{\frac{1}{2}}$ where D is the particle diameter and X is the volume fraction. Thus if D is about 20 micrometers and X is 0.2, then Y is about 35 micrometers. So a contact pad size of about $2Y \times 2Y = 70 \times 70$ micrometers would be adequate to have several conductive columns per pad. If the periodicity of contact pad repetition is twice the pad size, then the resolution of shear sensing would be about 4 Y or 140 micrometers. Smaller dimensions for D can resolve smaller distances.

As a specific example, a sensor of the type illustrated in FIG. 1 was prepared by mixing 5% by volume of silver-coated nickel spheres (average diameter 20 micrometers coated with 1000 angstroms of silver) with uncured General Electric RTV silicone elastomer. The mixture was then spread using a doctor blade as a sheet of about 200 micrometers thickness on the surface of a printed circuit board having parallel gold-plated copper contact pads (250 micrometers wide, 50 micrometers high, and 250 micrometers separation). The layer was heat cured at 100° C. for 15 minutes in the presence of a 600 Oe vertical magnetic field. A thin layer of lubricating oil was placed over the cured surface.

As a skin material, a 200 micrometer sheet of RTV615 silicone elastomer was prepared with a 2 mm wide silver foil metal cursor embedded near its surface. This elastomer skin was placed over the anisotropic conductor with the metal cursor facing the exposed conductor surface as shown in FIG. 1.

In the absence of finger-tip contact, all neighboring pairs in the contact pad array showed open circuits. With finger-tip contact estimated in the pressure range of 1-10 psi, three pad pairs exhibited electrical resistance in the range 0.5 to 5 $\Omega$. With slight finger-tip sliding, other pairs become electrically connected while the original pairs became open circuited, indicating shear movement. Resolution of shear sensing was about 500 micrometers, and a range of shear displacement in excess of 5 mm was attainable.

Figure 5:
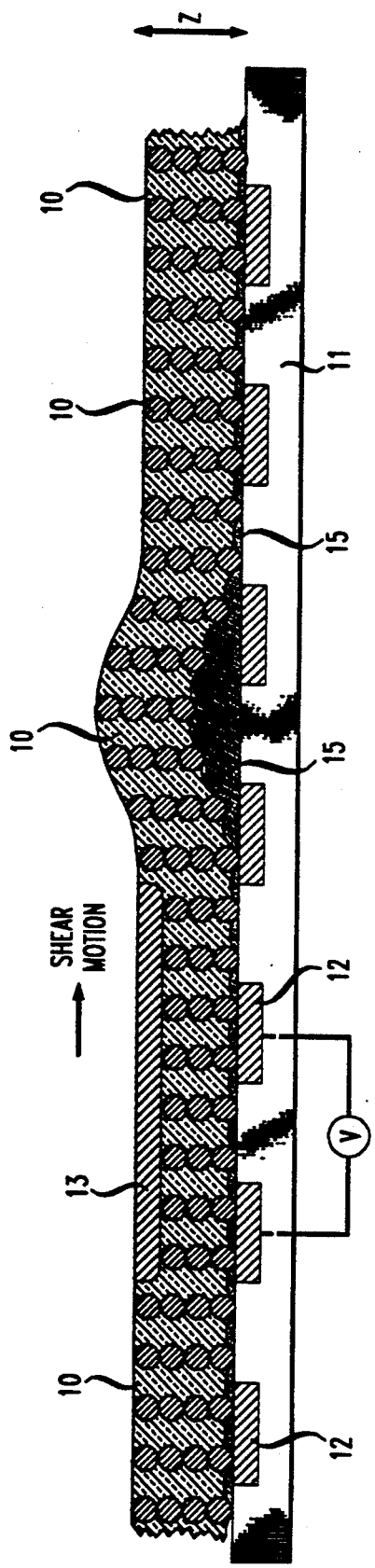
FIG. 5 is a schematic cross section of a second embodiment of a sensor in accordance with the invention.

FIG. 5 is a schematic cross section of an alternative sensor wherein the surface 11 is preferably flat with contact pads 12 that preferably do not protrude above the surface. In this embodiment, the anisotropic conductive material 10 can be prepared separately as a free-standing elastomeric sheet with a metal cursor affixed to one side. The sheet is placed on the surface 11 with protruding particles facing the contact pads, and the cursor disposed on the surface of layer 10 away from the pads 12. In this embodiment the elastomeric sheet 10 is slid over surface 11, and the position change can be detected in a manner similar to detection in the FIG. 1 embodiment.

The use of an anisotropic conductive elastomer in the sensors of FIGS. 1 and 5 has many advantages. The elastomer reduces unreliable contact behavior due to variations in contact pad height by conforming to pad height. In addition, a compliant elastomer reduces frictional wear of the cursor and protects the contact pads from mechanical shock, abrasion and atmospheric corrosion. The protruding particles near the surface permit electrical contact with the cursor under low pressure—even in the presence of lubricant.

Figure 6:
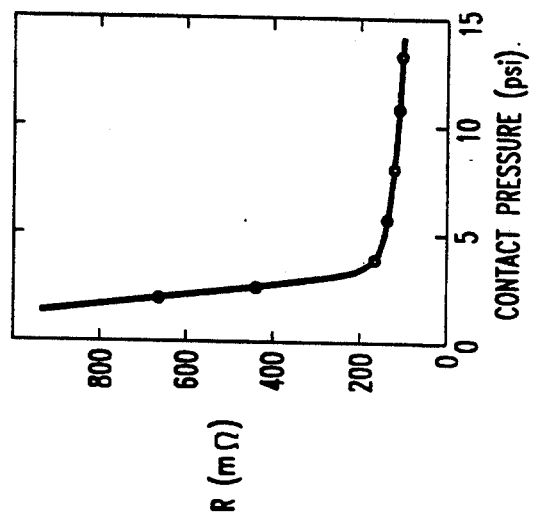
FIG. 6 is a graphical illustration showing the relation between resistance and contact pressure for sensors of the type shown in FIGS. 1 and 5.

Another advantage of the sensors of FIGS. 1 and 5 is that they can also be used to measure pressure in the Z-direction. Such measurements can be made if layer 10 is an elastomer because Z-direction pressure varies the contact resistance at the interfaces between neighboring conductive particles. FIG. 6 is a graphical illustration of the resistance versus pressure for the structure of FIG. 1. This resistance-pressure characteristic was essentially reproducible in the pressure range studied. Consequently the sensor can simultaneously detect shear force and the magnitude of Z-direction pressure. It can be used, for example, as a compact computer "mouse" or "joy-stick" capable of controlling simulated motion in three dimensions. Since changes in temperature manifest themselves by differential thermal expansion within layer 10, the sensor can also be used to detect changes in temperature.

It is to be understood that the above-described embodiments are illustrative of only some of the many possible specific embodiments which can represent applications of the principles of the invention. Numerous and varied other arrangements can be made by those skilled in the art without departing from the spirit and scope of the invention.

We claim:

1. A sensor capable of detecting shear force comprising:
    an array of conductive electrical contacts disposed on a non-conducting substrate;
    a layer of anisotropically conductive material disposed overlying said array of contacts; and a conductive cursor attached to an elastomeric layer movable in response to the application of shear force, said cursor positioned and dimensioned to interconnect at least a pair of said electrical contacts through said anisotropic conductive material.

2. A sensor according to claim 1 wherein said layer of anisotropic conductive material comprises a layer of non-magnetic matrix material having a pair of major surfaces and a plurality of columns of magnetic particles extending between said major surfaces.

3. A sensor according to claim 1 wherein said layer of anisotropically conductive material is fixed to said substrate.

4. A sensor according to claim 1 wherein said layer of anisotropic conductive material is fixed to said substrate and said cursor is fixed to an elastomeric layer overlying said anisotropic conductive layer.

5. A sensor according to claim 1 wherein lubricating material is disposed between said elastomeric layer and said anisotropic conductive layer.

6. A sensor according to claim 1 wherein said layer of anisotropic conductive material is an elastomeric material which can be elastically moved over said array of contacts and said cursor is attached to said layer of anisotropic conductive material.

7. A sensor according to claim 6 wherein lubricating material is disposed between said layer of anisotropic material and said substrate.

8. A sensor according to claim 2 wherein said anisotropic conductive layer has a thickness in the range 10-500 micrometers and said magnetic particles have diameters in the range 10-500 micrometers.

9. A sensor according to claim 2 wherein said non-magnetic matrix material comprises a material chosen from the group consisting of epoxy, glass, silicone, and polyurethane.

10. A sensor according to claim 2 wherein said magnetic particles comprise particles of material chosen from the group consisting of Fe, Ni, Co, $Ni_{80}Fe_{20}$, $SmCo_5$, $Nd_2Fe_{14}B$, and ferrites.

* * * * *